United States Patent [19]
Schulze

[11] 3,883,881
[45] May 13, 1975

[54] PHOTOGRAPHIC CAMERA HAVING AN INTERCHANGEABLE OBJECTIVE

[75] Inventor: Heinz Schulze, Dresden, Germany

[73] Assignee: Veb Pentacon Dresden, Dresden, Germany

[22] Filed: Oct. 2, 1972

[21] Appl. No.: 293,914

[52] U.S. Cl. ................................. 354/46; 354/57
[51] Int. Cl. ............................................ G03b 7/06
[58] Field of Search....... 95/10 C, 42, 64 R; 354/46, 354/57

[56] References Cited
UNITED STATES PATENTS

| | | | |
|---|---|---|---|
| 3,082,672 | 3/1963 | Swarofsky et al. | 95/10 C |
| 3,262,380 | 7/1966 | Winkler | 95/10 C |
| 3,598,036 | 8/1971 | Seezieke | 95/64 R |
| 3,603,234 | 9/1971 | Strehle et al. | 95/42 |
| 3,683,765 | 8/1972 | Ivra | 95/10 C |

Primary Examiner—Fred L. Braun
Assistant Examiner—E. M. O'Connor
Attorney, Agent, or Firm—William A. Drucker

[57] ABSTRACT

A single lens reflex camera having an exposure measuring device positioned in the light path of the camera has setting means for adjustment of the exposure measuring device according to the diaphragm set on an inter-changeable objective. An immovable fine control member is fixed to an objective which has no movable fine control element, to enable the objective to be used with the camera. The size of the immovable fine control member is such as to hold the setting means against a return spring in a position corresponding to the maximum aperture of the objective. Being a non-preselectable objective, the setting means remains in this position irrespective of the particular aperture size chosen.

1 Claim, 2 Drawing Figures 3,883,881

PHOTOGRAPHIC CAMERA HAVING AN INTERCHANGEABLE OBJECTIVE

BACKGROUND TO THE INVENTION

This invention relates to single lens reflex cameras and to the adaption of interchangeable objectives for use therewith.

There are known built-in exposure measuring devices which are provided in single lens reflex cameras and yield the desired measuring result by internal measuring with open diaphragm. However, this requires special objectives with fine control elements which cooperate with setting means of the exposure measuring device in the camera and are coupled with the diaphragm stop setting means of the objective.

Interchangeable objectives which have no such control elements can likewise be attached to the camera and are suitable for taking photographic pictures. Known cameras are therefore provided with stops which limit the return movement of the setting means of the exposure measuring devices in the initial position corresponding to the widest diaphragm aperture. With the aid of such stops it is possible to carry out exposure measurings with the objective diaphragm stopped down to the required diaphragm aperture.

However, with conventional cameras which have no such stops, such measurings are not possible.

The object of the invention is the adaptation, particularly the possibility of subsequent adaptation, of interchangeable objectives which have no control members coupled with the diaphragm stop setting means, to conventional cameras with internal exposure meter.

SUMMARY OF INVENTION

According to the invention there is provided a method of adapting an interchangeable objective which has a housing, a non-preselectable diaphragm, diaphragm setting means within the housing for adjusting said diaphragm, but no fine control element movable in response to the diaphragm setting means, for use with a single lens reflex camera having a housing, an exposure meter arranged in the housing and including a photoelectric device positioned in the light path of the camera, a moving coil, and a needle attached to said moving coil, settable indicating means movable within the housing and a return spring acting on said indicating means, whereby alignment of said needle with said indicating means indicates correct exposure, said method comprising the step of affixing to said objective housing an immovable fine control element for cooperation with said setting means when said objective is fixed in said camera housing, to hold said indicating means against said return spring in a position corresponding to the widest aperture which can be set on said objective.

BRIEF DESCRIPTION OF DRAWING

The invention is explained by way of example with reference to an embodiment described below and illustrated in the drawing where:

FIG. 1 shows a camera housing within which a galvanometer 3 having a needle 4 can be adjusted in relation to a time scale 2. A follow-up mark 5 is carried on a regulating arm 6 which is concentrically pivoted about the galvanometer 3, and a return spring 8 attempts to rotate the arm 6 in a clockwise direction. A photoelectric cell 7 situated in the optical path of the camera is connected in known manner to the galvanometer 3. A pointer 9 is provided on the regulating arm 6 opposite several diaphragm scales 10a, b, c, the purpose of which will be described below.

Figure 1:
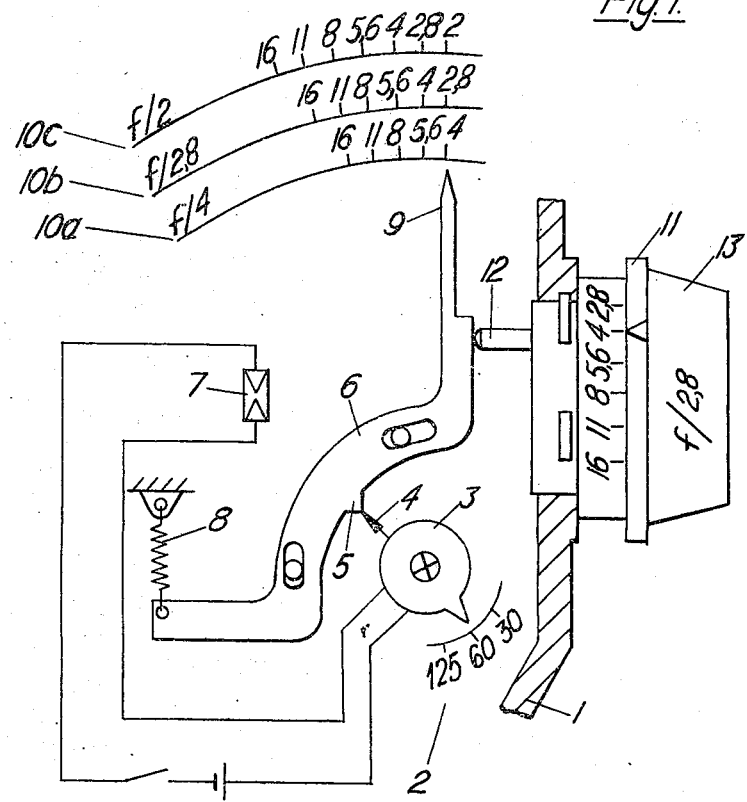
FIG. 1 shows part of a camera with an exposure measuring device where different initial apertures are automatically taken into account by additional movements of the regulating arm in combination with an interchangeable objective according to the invention.
Figure 2:
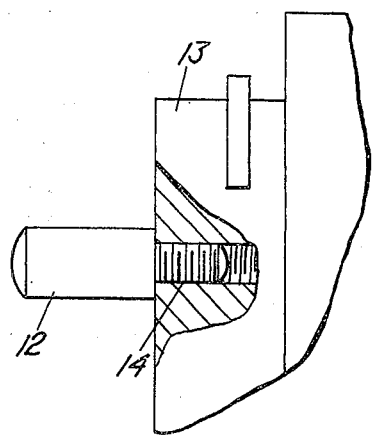
FIG. 2 shows the fixing of the fine control element according to FIG. 1 in the housing of the objective.

The camera housing 1 (of FIG. 1) is suitable for use with a known objective (not shown) having a preselectable diaphragm, a diaphragm aperture preselecting ring and a control member extending from the back of the objective, which control member is linked to the aperture preselecting ring. The length of the control member is such, in the maximum relative aperture position of the preselecting ring, to position the regulating arm 6 in the same position irrespective of the maximum relative aperture. On rotating the preselecting ring however, the regulating arm 6 is moved, thereby moving the pointer 9 over the scales 10a, b, c. The diaphragm aperture selected by the preselecting ring of the objective is indicated on the appropriate scale 10a, b, or c by the position of the pointer 9.

The arrangement of the camera housing 1 with such a known objective operates as follows. Light from the subject to be photographed falls on the photo-electric cell 7 and the position of the pointer 4 is influenced thereby. The aperture preselecting ring of the objective is rotated thereby changing the position of the regulating arm 6 while the aperture of the objective remains fully open. The preselecting ring is rotated until the follow-up marker 5 stands opposite the pointer 4. The pointer 9 then indicates on the appropriate scales 10a, b or c the aperture to which the objective must be stopped down before exposure is made.

However, conventional interchangeable objectives which have a nonpreselectable diaphragm but no control member extending from the back of the objective, cannot, but for the present invention, be used with such a camera housing. An interchangeable objective which has a non-preselectable diaphragm and which has been adapted according to the invention is shown in FIG. 1 attached to the camera housing.

The interchangeable objective 13 attached to the camera housing 1 has a non-preselectable diaphragm, and a diaphragm aperture adjusting ring 11. Fixed on the back side of the objective 13 is an immovable control member 12 which, as shown in FIG. 1, co-operates with the regulating arm 6 to hold the latter against the force of the spring 8. The control member 12 is attached to the objective by a screw thread 14. Not only is the control member 12 independant of the selected diaphragm aperture of the objective, but its size is also independant of the maximum relative aperture of the objective so that the regulating arm 6 is held in the same position irrespective of the maximum relative aperture of the objective.

The arrangement shown in FIG. 1 operates as follows: Light from the subject to be photographed falls on the photo-electric cell 7 and the position of the pointer 4 is influenced thereby. The aperture adjusting ring 11 is rotated thereby opening or closing the aperture of the objective which alters the intensity of light falling on the photo-electric cell 7, and thus changes the position of the pointer 4. The aperture adjusting ring 11 is rotated until the pointer 4 stands opposite the follow-up marker 5.

I claim:

1. In a photographic camera assembly an interchangeable objective which has a housing, a non-preselectable diaphragm, diaphragm setting means within the housing for adjusting said diaphragm, a camera housing, an exposure meter arranged in the camera housing and including a photoelectric device positioned in the light path of the assembly camera, a moving coil, and a needle attached to said moving coil, settable indicating means movable within the housing and a return spring acting on said indicating means, whereby alignment of said needle with said indicating means indicates correct exposure, a fine control element affixed to said objective housing, said control element being immovable with respect to said diaphragm setting means for cooperation with said indicating means when said objective is fixed in said camera housing, to hold said indicating means against said return spring in a position corresponding to the widest aperture which can be set on said objective.

* * * * *